United States Patent
Xu et al.

(10) Patent No.: US 9,497,484 B2
(45) Date of Patent: Nov. 15, 2016

(54) BASE COLOR MERGING FOR MULTI-STAGE BASE COLOR AND INDEX MAP (MBCIM) FOR REXT

(71) Applicant: SONY CORPORATION, Tokyo (JP)

(72) Inventors: Jun Xu, Sunnyvale, CA (US); Ali Tabatabai, Cupertino, CA (US)

(73) Assignee: SONY CORPORATION, Tokyo (JP)

( * ) Notice: Subject to any disclaimer, the term of this patent is extended or adjusted under 35 U.S.C. 154(b) by 315 days.

(21) Appl. No.: 14/325,350

(22) Filed: Jul. 7, 2014

(65) Prior Publication Data

US 2015/0010071 A1    Jan. 8, 2015

Related U.S. Application Data

(60) Provisional application No. 61/843,668, filed on Jul. 8, 2013, provisional application No. 61/846,542, filed on Jul. 15, 2013.

(51) Int. Cl.
 *H04N 7/12*   (2006.01)
 *H04N 19/593*   (2014.01)
 *H04N 19/46*   (2014.01)

(52) U.S. Cl.
 CPC ............ *H04N 19/593* (2014.11); *H04N 19/46* (2014.11)

(58) Field of Classification Search
 CPC .............................. H04N 19/46; H04N 19/593
 USPC ..................................................... 375/240.12
 See application file for complete search history.

(56) References Cited

U.S. PATENT DOCUMENTS

2009/0074307 A1 *   3/2009   Lu ............................. G06T 9/00
                                                                                     382/232
2009/0315905 A1 *   12/2009   Lu .......................... G06T 15/04
                                                                                     345/555
2013/0266058 A1 *   10/2013   Minoo ............. H04N 19/00006
                                                                                     375/240.02

FOREIGN PATENT DOCUMENTS

WO        2009036255 A2      3/2009

OTHER PUBLICATIONS

Liwei Guo, "Non-RCE3: Cross-check of JCTVC-N0235 base color merging for MBCIM," Non-RCE3: Cross-check of JCTVC-N0235 base color merging for MBCIM, pp. 1.
Liwei Guo, "HEVC Range Extensions Core Experiment 3 (RCE 3): Intra Coding Methods for Screen Content," Joint Collaborative Team on Video Coding (JCT-VC) of ITU-T SG 16 WP 3 and ISO/IEC JTC 1/SC 29/WG 11; 13th Meeting: Incheon, KR, Apr. 18-26, 2013.

* cited by examiner

*Primary Examiner* — Jessica M Prince
(74) *Attorney, Agent, or Firm* — Chip Law Group

(57) ABSTRACT

An enhancement for removing signaling redundancy of base color within multi-stage base color and index map (MBCIM) processing of HEVC for computer generated screen content is presented. Redundancy is removed in response to determining and setting merge flags when neighboring pixels are coded and available. During coding of pixels in the current CU, then color are copied from the neighboring blocks when a merge flag is set, or the pixel is coded as it was previously.

20 Claims, 4 Drawing Sheets

| 001 | coding_unit( x0, y0, log2CbSize ) { | Descriptor |
|---|---|---|
| 002 | if( transquant_bypass_enabled_flag ) | |
| 003 | cu_transquant_bypass_flag | ae(v) |
| 004 | if( slice_type != I ) | |
| 005 | cu_skip_flag[ x0 ][ y0 ] | ae(v) |
| 006 | nCbS = ( 1 << log2CbSize ) | |
| 007 | if( cu_skip_flag[ x0 ][ y0 ] ) | |
| 008 | prediction_unit( x0, y0, nCbS, nCbS ) | |
| 009 | else { | |
| 010 | if( slice_type != I ) | |
| 011 | pred_mode_flag | ae(v) |
| 012 | if( CuPredMode[ x0 ][ y0 ] != MODE_INTRA \|\| log2CbSize == MinCbLog2SizeY ) | |
| 013 | part_mode | ae(v) |
| 014 | if( CuPredMode[ x0 ][ y0 ] == MODE_INTRA ) { | |
| 015 | if( PartMode == PART_2Nx2N && pcm_enabled_flag && log2CbSize >= Log2MinIpcmCbSizeY && log2CbSize <= Log2MaxIpcmCbSizeY ) | |
| 016 | MBCIM_mode_flag[x0][y0] | ae(v) |
| 017 | if (mbcim_mode_flag) { | |
| 018 | mbcim_coding ( x0, y0, nCbS, nCbS, 0) | |
| 019 | mbcim_coding ( x0, y0, nCbS/ SubWidthC , nCbS/ SubHeightC , 1) | |
| 020 | mbcim_coding ( x0, y0, nCbS/ SubWidthC , nCbS/ SubHeightC, 2) | |
| 021 | } | |
| 022 | else{ | |
| 023 | if( CuPredMode[ x0 ][ y0 ] == MODE_INTRA ) { | |
| 024 | if( PartMode == PART_2Nx2N && pcm_enabled_flag && log2CbSize >= Log2MinIpcmCbSizeY && log2CbSize <= Log2MaxIpcmCbSizeY ) | |
| 025 | pcm_flag[ x0 ][ y0 ] | ae(v) |
| 026 | ....... | |

FIG. 4A

| 001 | mbcim_coding ( x0, y0, nPbW, nPbH , cIdx){ | |
|---|---|---|
| 002 |   If (IsColorMergeLeftAllowed){ | |
| 003 |     color_merge_left_flag | ae(v) |
| 004 |   } | |
| 005 |   If(IsColorMergeUpAllowed && ! color_merge_left_flag){ | |
| 006 |     color_merge_up_flag | ae(v) |
| 007 |   } | |
| 008 |   If(! color_merge_left_flag && ! color_merge_up_flag){ | |
| 009 |     color_size_minus1[x0][y0] | ae(v) |
| 010 |     for( i = 0; i <=color_size_minus1[x0][y0]; i ++) | |
| 011 |       color_table[x0][y0][i] | ae(v) |
| 012 |   } | |
| 013 |   for( j = 0; j < nPbW; j = j + 1) | |
| 014 |     for( i = 0; i < nPbH ; i = i + 1) | |
| 015 |       prev_index_first_pred_flag[ x0 + i ][ y0 + j ] | ae(v) |
| 016 |   for( j = 0; j < nPbW; j = j + 1) | |
| 017 |     for( i = 0; i < nPbH ; i = i + 1) | |
| 018 |       if(prev_index_first_pred_flag [ x0 + i ][ y0 + j ] && color_size_minus1 [x0][y0] > 1) | |
| 019 |         prev_index_second_pred_flag [ x0 + i ][ y0 + j ] | ae(v) |
| 020 |   for( j = 0; j < nPbW; j = j + 1) | |
| 021 |     for( i = 0; i < nPbH ; i = i + 1) | |
| 022 |       if ( prev_index_first_pred_flag [ x0 + i ][ y0 + j ]<br>        && prev_index_second_pred_flag [ x0 + i ][ y0 + j ]<br>        && color_size_minus1 [x0][y0]  > 2 ) | |
| 023 |         rem_index [ x0 + i ][ y0 + j ] | ae(v) |

FIG. 4B

BASE COLOR MERGING FOR MULTI-STAGE BASE COLOR AND INDEX MAP (MBCIM) FOR REXT

CROSS-REFERENCE TO RELATED APPLICATIONS

This application claims priority to, and the benefit of, U.S. provisional patent application Ser. No. 61/843,668 filed on Jul. 8, 2013, incorporated herein by reference in its entirety. This application claims priority to, and the benefit of, U.S. provisional patent application Ser. No. 61/846,542 filed on Jul. 15, 2013, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

1. Technological Field

This invention pertains generally to screen content coding in high efficiency video coding (HEVC) systems, and more particularly to base color merging (BCM) within HEVC utilizing a multi-stage base color and index map (MBCIM).

2. Background Discussion

In JCTVC-M0330, a multi-stage base color and index map (MBCIM) has been advanced for screen content coding in Range extension (RExt) for high-efficiency video coding (HEVC). This mode for coding screen content is based on the intra coding framework of the high efficiency video coding (HEVC) standard. In this method a decomposition of each intra predict unit (PU) is first performed into color components and structure components. Afterward, a two-stage prediction scheme is employed to generate two prediction indexes for each pixel to code those structure components.

FIG. 1 depicts, as per the JCTVC-M0330 disclosure, decomposition of a CU input block into colors, for example five colors shown, and composition of the reconstructed block. A structure map is seen with the color numbers for each pixel of the example CU.

As described for MBCIM, screen content refers to computer generated images or videos. This screen content differs from photographic images in two primary regards. (1) Screen content blocks are typically dominated by a limited number of major colors, generally these are significantly different from each other. (2) Block structures found in screen content is generally more complex than found in photographic images. As MBCIM methods progress there is additional need for increasing coding efficiency.

Accordingly, a need exists for further enhancements of MBCIM toward reducing redundancy.

BRIEF SUMMARY

In JCTVC-M0330, multi-stage base color and index map (MBCIM) is proposed for screen content coding in range-extension of HEVC (RExt). A coding unit (CU) in MBCIM mode will signal base color including number and values of base colors first. After that, an index map is signaled indicating color states for each pixel of the CU.

The present disclosure provides solutions for removing redundancy in signaling of base colors by using a merging mechanism, referred to herein as base color merging (BCM) to form MBCIM-BCM. Utilizing this new syntax, such as containing a merge_left_flag and merge_up_flag, bit-coding savings (increased coding efficiency) can be accrued for the current CU by signaling and then copying base colors from a left or up neighboring CU.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 4A and FIG. 4B are pseudo-code examples of modifying proposed MBCIM techniques from JCTVC-M0330, to accomplish base color merging according to at least one embodiment of the disclosed technology.

DETAILED DESCRIPTION

The present disclosure takes advantage of color correlations which exist between base colors of coding units (CUs) utilized in a local region, thereby reducing redundancy of base color signaling when using a multi-stage base color and index map (MBCIM).

MBCIM mode is decided at the CU level, with two parts to be coded. A base color is coded including number of base colors and values for these base colors. In addition, an index map must be coded having an index value for each pixel being quantized based on the base colors.

A merging mechanism is utilized in the present disclosure to reduce the redundancy of signaling base colors. To achieve this, merging flags are utilized, such as indicating base color merging with neighboring CUs to the left or above the current CU. If neighboring CUs are using MBCIM modes, then merging flags (i.e., color_merge_left_flag and color_merge_up_flag) are signaled to copy either neighboring base color. These flags share a single context. If both merge flags are off, then base color is signaled as following the original algorithm. There is one dedicated context for the merge flags of all color components in CABAC.

Figure 1:
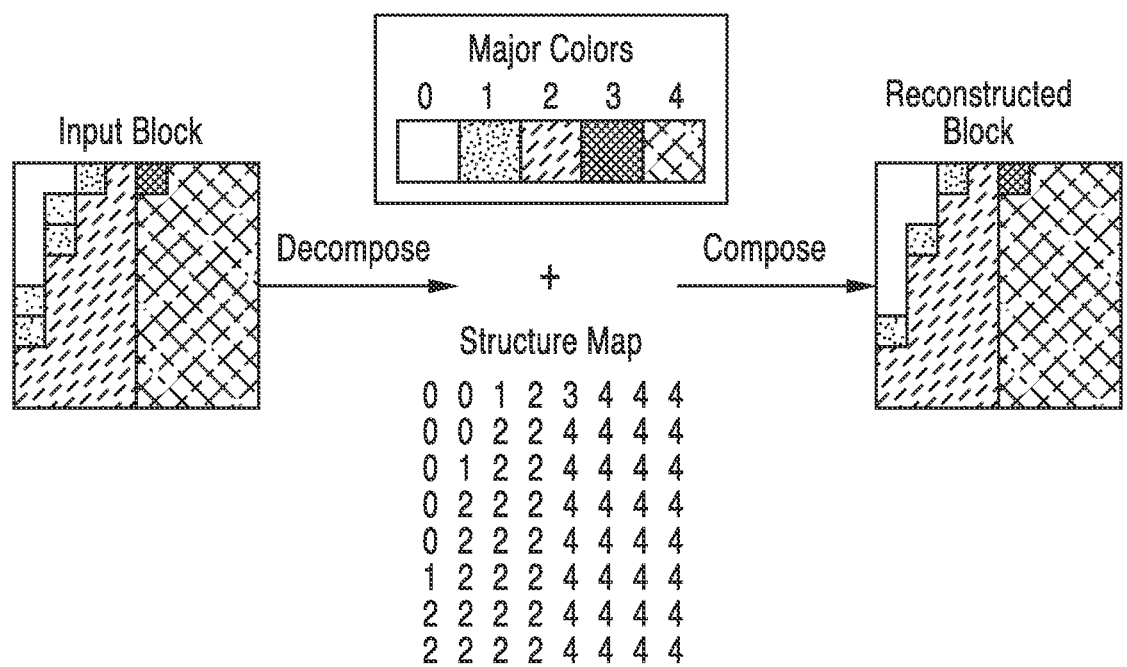
FIG. 1 is a diagram of MBCIM performing decomposition and composition of pixel color coding, showing an example with five colors.
Figure 2:
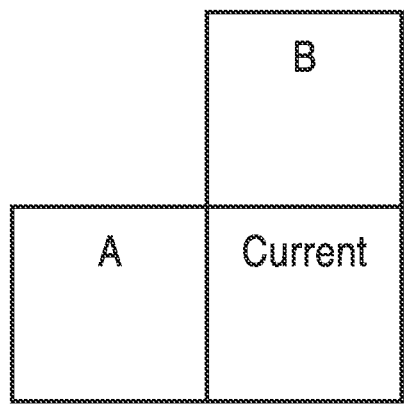
FIG. 2 is a diagram of a current coding unit (CU) block seen in relation to its previously coded CU neighbors A and B.

FIG. 2 depicts a current CU in relation to its left CU neighbor "A", and a top CU neighbor "B".

Figure 3:
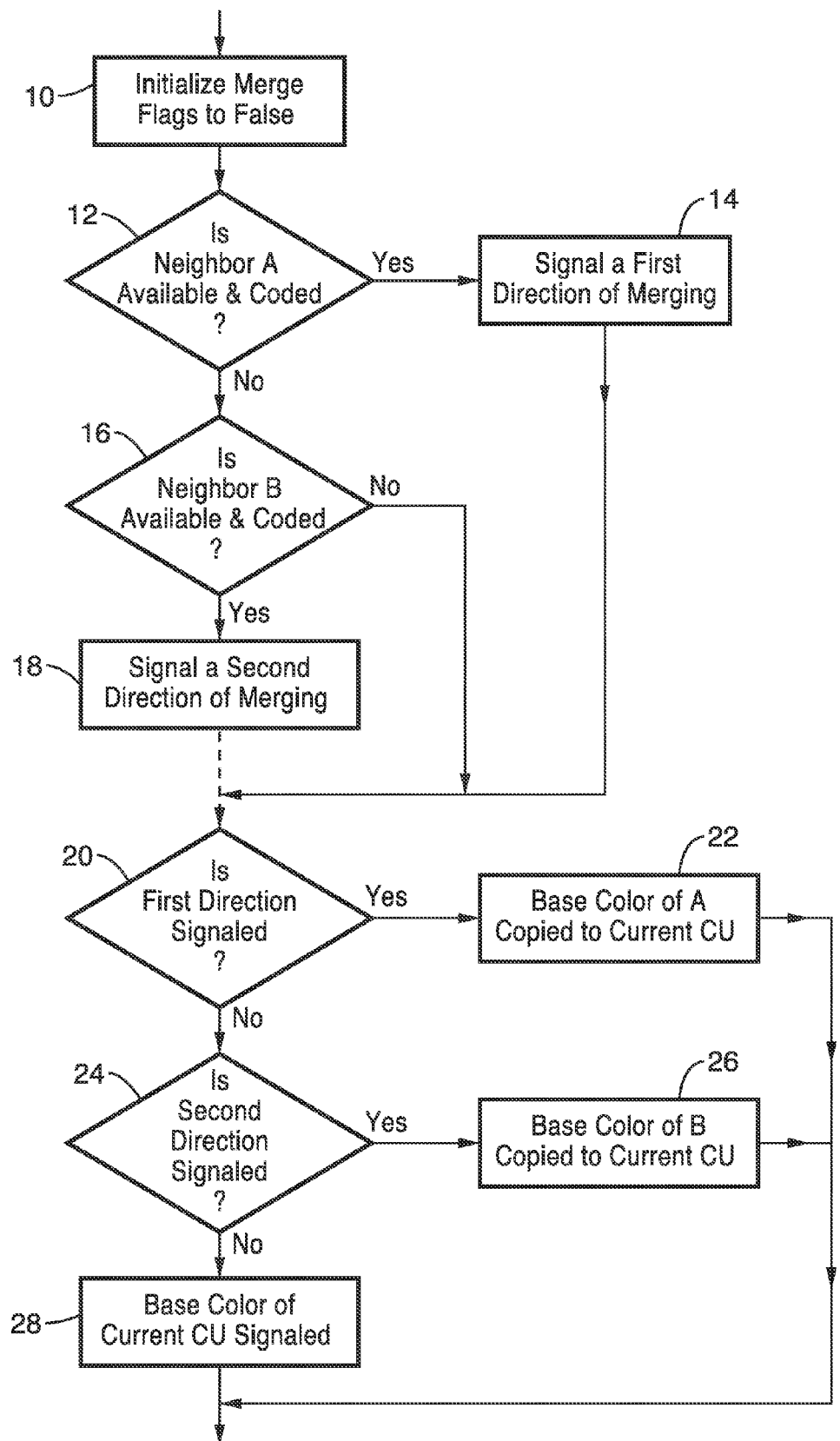
FIG. 3 is a flowchart for performing base color merging for MBCIM according to at least one embodiment of the disclosed technology.

FIG. 3 illustrates a generalized flow diagram for performing base color merging according to the present disclosure. Merge flags are initialized to false (no merge) 10. A determination is made 12 if a first neighbor "A" (located in a first direction from current CU) is available and coded. It is preferable of course, that the merge only be performed if the colors used in the neighboring block are equal to, or at least have each of the colors necessary in coding the current block. If it is available and coded and equivalent, then a signal is generated (e.g., flag) 14 for this first direction of merging. Otherwise a determination is made 16 if a second neighbor "B" (located in a second direction from the current CU) is available and coded. If this second neighbor is available and coded, then a signal is generated (e.g., flag) 18 for this second direction of merging. In moving into the coding stage, we see a check 20 for the first direction merge signal, and if true then the base color of neighbor A is copied 22 to the current CU. Otherwise, a check is made 24 for the second direction merge signal, and if true then the base color of neighbor B is copied 26 to the current CU. If neither of the neighbors are available and coded, then step 28 is executed in which the base color of the current CU is signaled.

The above steps can be similarly described as follows.

If A is available and coded with MBCIM mode, then a merge_left_flag is signaled; otherwise, merge_left_flag is false.

If merge_left_flag is false and B is available and coded with MBCIM mode, a merge_up_flag is signaled; otherwise, merge_up_flag is false.

If merge_left_flag is true, base color of A is copied to current CU.

If merge_up_flag is true, base color of B is copied to current CU.

If merge_left_flag and merge_up_flag are both false, base color of current CU is signaled.

The enhancements described in the presented technology can be readily implemented within various image and video encoders and decoders. It should also be appreciated that encoders and decoders are preferably implemented to include one or more computer processor devices (e.g., CPU, microprocessor, microcontroller, computer enabled ASIC, etc.) and associated memory (e.g., RAM, DRAM, NVRAM, FLASH, computer readable media, etc.) whereby programming stored in the memory and executable on the processor perform the steps of the various process methods described herein. The computer and memory devices were not depicted in the diagrams, toward maintaining a simplicity of illustration, as one of ordinary skill in the art recognizes the use of computer devices for carrying out steps involved with image/video encoding and decoding. The presented technology is non-limiting with regard to memory and computer-readable media, insofar as these are non-transitory, and thus not constituting a transitory electronic signal.

FIG. 4A through FIG. 4B depicts an example of pseudo-code changes to implement the case of color merging in RCE3 for use in JCTVC-M0330, shown by way of example and not limitation. The changes are seen in the dashed lines shown in lines 002 through 012 in FIG. 4B and illustrate the determination and setting of a color_merge_left_flag, determination and setting of a color_merge_up_flag, and setting of the color for the current CU.

The enhancements described in the presented technology can be readily implemented within various image and video encoders and decoders. By way of example and not limitation, the flow diagram of FIG. 3, and pseudo-code of FIG. 4A and FIG. 4B, are configured for being executed by a computer processor in response to programming. It should be appreciated that image/video encoders and decoders are preferably implemented to include one or more computer processor devices (e.g., CPU, microprocessor, microcontroller, computer enabled ASIC, etc.) and associated memory (e.g., RAM, DRAM, NVRAM, FLASH, computer readable media, etc.) whereby programming stored in the memory and executable on the processor perform the steps of the various process methods described herein. The computer and memory devices were not depicted in the diagrams for the sake of simplicity of illustration, as one of ordinary skill in the art recognizes the use of computer devices for carrying out steps involved with image/video encoding and decoding. The presented technology is non-limiting with regard to memory and computer-readable media, insofar as these are non-transitory, and thus not constituting a transitory electronic signal.

Simulations were performed utilizing the proposed tool implemented based on JCTVC-M0330 (RCE3.2) software released on Jul. 7, 2013 to RCE3 participant list and tested under testing conditions defined in RCE3. Encoding and decoding time information is not available in simulation results because simulations are conducted in a heterogeneous cluster. Since the approach of the present technology is a relatively small change to JCTVC-M0330, complexity and associated computational overhead is not significantly increased.

The results for lossless coding are summarized in Tables 1A through Table 1C, where the anchor is HM10.1_RExt3.1. Underlined entries in each of these tables indicate conditions under which the present disclosure provides a significant savings as a percentage of bitstream coding. Table 2A through Table 2C depict results compared to JCTVC-M0330. It will be seen that the use of base color merging (BCM) improves coding efficiency by −1.3%~−1.5% for SC RGB sequences and −0.2%~−0.6% for SC YUV 444 sequences.

The results for lossy coding are summarized in Table 3A through Table 3G, where the anchor is HM10.1_RExt3.1. Compared to JCTVC-M0330 as shown in Table 2, the presented technology coding efficiency by −0.3% for class F sequences at all tiers, −1.6% for SC RGB sequences at all tiers and −0.9% for SC YUV 444 sequences at all tiers. A summary of results is also seen in Table 4A through Table 4G compared to JCTVC-M0330 (RCE3.2) with JCTVC-M0330 (RCE3.2) as anchor.

This proposal improves MBCIM in RCE3 by merging base color for left and above neighboring CU. Results show consistent coding gain for both lossless and lossy coding.

Embodiments of the present invention may be described with reference to flowchart illustrations of methods and systems according to embodiments of the invention, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula (e), or computational depiction(s).

It will further be appreciated that "programming" as used herein refers to one or more instructions that can be executed by a processor to perform a function as described herein. The programming can be embodied in software, in firmware, or in a combination of software and firmware. The programming can be stored local to the device in non-transitory media, or can be stored remotely such as on a server, or all or a portion of the programming can be stored locally and remotely. Programming stored remotely can be downloaded (pushed) to the device by user initiation, or automatically based on one or more factors. It will further be appreciated that as used herein, that the terms processor, central processing unit (CPU), and computer are used synonymously to denote a device capable of executing the programming and communication with input/output interfaces and/or peripheral devices.

From the description herein, it will be appreciated that that the present disclosure encompasses multiple embodiments which include, but are not limited to, the following:

1. An apparatus for base color merging for multi-stage base color and index map (MBCIM) video coding of screen content, comprising: (a) a computer processor configured for video and image processing; and (b) programming in a non-transitory computer readable medium and executable on the computer processor with steps including: (i) performing multi-stage base color and index map (MBCIM) coding of screen content based on an intra coding framework; (ii) setting a first direction merge flag if a first neighbor of the current coding unit (CU) is determined to be available and coded with proper colors; (iii) setting a second direction merge flag if a second neighbor of the current coding unit (CU) is determined to be available and coded with proper colors; (iv) establishing a color for the current CU, by copying base color from the first neighbor to the current CU in response to detecting a first state of said first direction merge flag, or copying base color from the second neighbor to the current CU in response to detecting a first state of said second direction merge flag; and (v) coding the base color of the current CU if neither said first direction merge flag, or said second direction merge flag, is set.

2. The apparatus of any preceding embodiment, wherein said first neighbor is found in a horizontal direction from the current CU, into previously coded neighbors.

3. The apparatus of any preceding embodiment, wherein said first neighbor is a left neighbor, when coding is performed in a top down left to right manner.

4. The apparatus of any preceding embodiment, wherein said second neighbor is found in a vertical direction from the current CU, into previously coded neighbors.

5. The apparatus of any preceding embodiment, wherein said second neighbor is a top neighbor, when coding is performed in a top down left to right manner.

6. The apparatus of any preceding embodiment, wherein said apparatus is configured for execution within high efficiency video coding (HEVC) systems.

7. The apparatus of any preceding embodiment, wherein said apparatus is configured for range extension (RExt) in HEVC.

8. The apparatus of any preceding embodiment, wherein said screen content refers to computer generated images or videos.

9. The apparatus of any preceding embodiment, wherein said screen content differs from photographic images as CU blocks are dominated by a limited number of major colors.

10. The apparatus of any preceding embodiment, wherein said screen content differs from photographic images as the structure of CU blocks has additional complexity.

11. The apparatus of any preceding embodiment, wherein said programming executable on the computer processor is configured for coding the base color of the current CU by performing steps including: (a) decomposition of each intra predict unit (PU) into color components and structure components; and (b) performing a two-stage prediction scheme employed to generate two prediction indexes for each pixel to code those structure components.

12. An apparatus for base color merging for multi-stage base color and index map (MBCIM) video coding of screen content in response to high efficiency video coding (HEVC), comprising: (a) a computer processor configured for video and image processing; and (b) programming in a non-transitory computer readable medium and executable on the computer processor with steps including: (b)(i) performing multi-stage base color and index map (MBCIM) coding of screen content based on an intra coding framework; (b)(ii) setting a first direction merge flag if a first neighbor of the current coding unit (CU) is determined to be available and coded with proper colors; (b)(iii) setting a second direction merge flag if a second neighbor of the current coding unit (CU) is determined to be available and coded with proper colors; wherein said first neighbor and said second neighbor are selected from previously coded horizontal and vertical neighbors; (b)(iv) establishing a color for the current CU, by copying base color from the first neighbor to the current CU in response to detecting a first state of said first direction merge flag, or copying base color from the second neighbor to the current CU in response to detecting a first state of said second direction merge flag; and (b)(v) coding the base color of the current CU if neither said first direction merge flag, or said second direction merge flag, is set.

13. The apparatus of any preceding embodiment, wherein said first neighbor is found in a horizontal direction from the current CU, into previously coded neighbors.

14. The apparatus of any preceding embodiment, wherein said first neighbor is a left neighbor, when coding is performed in a top down left to right manner.

15. The apparatus of any preceding embodiment, wherein said second neighbor is found in a vertical direction from the current CU, into previously coded neighbors.

16. The apparatus of any preceding embodiment, wherein said second neighbor is a top neighbor, when coding is performed in a top down left to right manner.

17. The apparatus of any preceding embodiment, wherein said apparatus is configured for range extension (RExt) in HEVC.

18. The apparatus of any preceding embodiment, wherein said screen content is computer generated, and differs from photographic images as coding unit (CU) blocks are dominated by a limited number of major colors.

19. The apparatus of any preceding embodiment, wherein said programming executable on the computer processor is configured for coding the base color of the current CU by performing steps including: (a) decomposition of each intra predict unit (PU) into color components and structure components; and (b) performing a two-stage prediction scheme employed to generate two prediction indexes for each pixel to code those structure components.

20. A method of performing base color merging for multi-stage base color and index map (MBCIM) video coding of screen content, comprising: (a) performing multi-stage base color and index map (MBCIM) coding of screen content based on an intra coding framework by a computer processor configured for video and image processing in response to programming executable by said computer processor from a non-transitory computer readable memory or medium; (b) setting a first direction merge flag if a first neighbor of the current coding unit (CU) is determined to be available and coded with proper colors; (c) setting a second direction merge flag if a second neighbor of the current coding unit (CU) is determined to be available and coded with proper colors; and (d) establishing a color for the current CU, by copying base color from the first neighbor to the current CU in response to detecting a first state of said first direction merge flag, or copying base color from the second neighbor to the current CU in response to detecting a first state of said second direction merge flag; and (e) coding the base color of the current CU if neither said first direction merge flag, or said second direction merge flag, is set.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1A

BCM Results for All Intra-Main in Lossless Coding anchor as HM10.1_RExt3.1

|  | Compression Ratio | | Bit-rate |
| --- | --- | --- | --- |
|  | Reference | Tested | Savings |
| Class F | 5.2 | 5.3 | 0.6% |
| Class B | 2.2 | 2.2 | 0.0% |
| SC RGB 444 | 10.1 | 19.1 | −31.1% |
| SC YUV 444 | 11.4 | 15.2 | −13.1% |
| RangeExt | 2.4 | 2.4 | 0.0% |

TABLE 1B

BCM Results for Random Access Main Lossless Coding anchor as HM10.1_RExt3.1

|  | Compression Ratio | | Bit-rate |
| --- | --- | --- | --- |
|  | Reference | Tested | Savings |
| Class F | 31.7 | 31.7 | −0.1% |
| Class B | 2.6 | 2.6 | 0.0% |
| SC RGB 444 | 100.4 | 194.9 | −26.6% |
| SC YUV 444 | 128.9 | 171.6 | −12.4% |
| RangeExt | 2.5 | 2.5 | 0.0% |

TABLE 1C

BCM Results for Low Delay B Main Lossless Coding anchor as HM10.1_RExt3.1

|  | Compression Ratio | | Bit-rate |
| --- | --- | --- | --- |
|  | Reference | Tested | Savings |
| Class F | 49.8 | 49.8 | −0.1% |
| Class B | 2.6 | 2.6 | 0.0% |
| SC RGB 444 | 381.6 | 776.8 | −24.5% |
| SC YUV 444 | 325.6 | 467.1 | −12.1% |
| RangeExt | 2.5 | 2.5 | 0.0% |

TABLE 2A

BCM Results for All Intra-Main in Lossless Coding anchor as JCTVC-M0330 (RCE3.2)

|  | Compression Ratio | | Bit-rate |
| --- | --- | --- | --- |
|  | Reference | Tested | Savings |
| Class F | 5.3 | 5.3 | 0.0% |
| Class B | 2.2 | 2.2 | 0.0% |
| SC RGB 444 | 18.6 | 19.1 | −1.5% |
| SC YUV 444 | 15.0 | 15.2 | −0.6% |
| RangeExt | 2.4 | 2.4 | 0.0% |

TABLE 2B

BCM Results for Random Access Main Lossless Coding
anchor as JCTVC-M0330 (RCE3.2)

| | Compression Ratio | | Bit-rate |
| --- | --- | --- | --- |
| | Reference | Tested | Savings |
| Class F | 31.7 | 31.7 | 0.0% |
| Class B | 2.6 | 2.6 | 0.0% |
| SC RGB 444 | 189.8 | 194.9 | −1.3% |
| SC YUV 444 | 169.6 | 171.6 | −0.6% |
| RangeExt | 2.5 | 2.5 | 0.0% |

TABLE 2C

BCM Results for Low Delay B Main Lossless Coding
anchor as JCTVC-M0330 (RCE3.2)

| | Compression Ratio | | Bit-rate |
| --- | --- | --- | --- |
| | Reference | Tested | Savings |
| Class F | 49.8 | 49.8 | 0.0% |
| Class B | 2.6 | 2.6 | 0.0% |
| SC RGB 444 | 747.3 | 776.8 | −1.6% |
| SC YUV 444 | 466.8 | 467.1 | −0.2% |
| RangeExt | 2.5 | 2.5 | 0.0% |

TABLE 3A

BCM Results for All Intra HE Main-tier Lossy Coding
with anchor as HM10.1_RExt3.1

| | Y | U | V |
| --- | --- | --- | --- |
| Class F | −16.1% | −15.0% | −16.5% |
| Class B | 0.0% | 0.0% | 0.0% |
| SC RGB 444 | −41.8 | −42.0 | −42.5 |
| SC YUV 444 | −26.5 | −25.2 | −25.7% |
| RangeExt | 0.0% | 0.0% | 0.0% |

TABLE 3B

BCM Results for All Intra HE High-tier Lossy Coding
anchor as HM10.1_RExt3.1

| | Y | U | V |
| --- | --- | --- | --- |
| Class F | −13.4% | −12.6% | −14.3% |
| Class B | 0.0% | 0.0% | 0.0% |
| SC RGB 444 | −43.8% | −43.7% | −44.3% |
| SC YUV 444 | −25.9% | −26.8% | −26.8% |
| RangeExt | 0.0% | 0.0% | 0.0% |

TABLE 3C

BCM Results for All Intra HE Super High-tier Lossy Coding
anchor as HM10.1_RExt3.1

| | Y | U | V |
| --- | --- | --- | --- |
| Class F | −10.7% | −11.6% | −12.0% |
| Class B | 0.0% | 0.0% | 0.0% |
| SC RGB 444 | −44.9% | −44.8% | −45.3% |
| SC YUV 444 | −27.0% | −28.3% | −28.0% |
| RangeExt | 0.0% | 0.0% | 0.0% |

TABLE 3D

BCM Results for Random Access HE Main-tier Lossy Coding
anchor as HM10.1_RExt3.1

| | Y | U | V |
| --- | --- | --- | --- |
| Class F | −11.6% | −12.2% | −12.2% |
| Class B | 0.1% | −0.1% | −0.1% |
| SC RGB 444 | −35.9% | −36.0% | −36.4% |
| SC YUV 444 | −21.3% | −22.8% | −22.8% |
| RangeExt | 0.0% | 0.0% | 0.0% |

TABLE 3E

BCM Results for Random Access HE High-tier Lossy Coding
anchor as HM10.1_RExt3.1

| | Y | U | V |
| --- | --- | --- | --- |
| Class F | −9.2% | −10.6% | −10.2% |
| Class B | 0.1% | −0.1% | −0.1% |
| SC RGB 444 | −37.7% | −37.7% | −38.2% |
| SC YUV 444 | −22.0% | −23.8% | −23.5% |
| RangeExt | 0.0% | 0.0% | 0.0% |

TABLE 3F

BCM Results for Low Delay B HE Main-tier Lossy Coding
anchor as HM10.1_RExt3.1

| | Y | U | V |
| --- | --- | --- | --- |
| Class F | −8.0% | −8.4% | −7.9% |
| Class B | 0.1% | −0.1% | −0.2% |
| SC RGB 444 | −30.2% | −30.1% | −30.6% |
| SC YUV 444 | −16.2% | −16.9% | −17.5% |
| RangeExt | 0.1% | −0.1% | 0.0% |

TABLE 3G

BCM Results for Low Delay B HE High-tier Lossy Coding
anchor as HM10.1_RExt3.1

| | Y | U | V |
| --- | --- | --- | --- |
| Class F | −6.6% | −7.2% | −6.8% |
| Class B | 0.0% | −0.1% | −0.1% |
| SC RGB 444 | −33.3% | −33.2% | −33.7% |
| SC YUV 444 | −16.9% | −17.7% | −18.1% |
| RangeExt | 0.1% | −0.1% | −0.1% |

TABLE 4A

BCM Results for All Intra HE Main-tier Lossy Coding
anchor as JCTVC-M0330 (RCE3.2)

| | Y | U | V |
| --- | --- | --- | --- |
| Class F | −0.4% | −0.3% | −0.4% |
| Class B | 0.0% | 0.0% | 0.0% |
| SC RGB 444 | −1.5% | −1.5% | −1.5% |
| SC YUV 444 | −0.9% | −0.8% | −0.8% |
| RangeExt | 0.0% | 0.0% | 0.0% |

TABLE 4B

BCM Results for All Intra HE High-tier Lossy Coding
anchor as JCTVC-M0330 (RCE3.2)

|  | Y | U | V |
|---|---|---|---|
| Class F | −0.4% | −0.3% | −0.4% |
| Class B | 0.0% | 0.0% | 0.0% |
| SC RGB 444 | −1.7% | −1.6% | −1.7% |
| SC YUV 444 | −0.9% | −0.8% | −0.8% |
| RangeExt | 0.0% | 0.0% | 0.0% |

TABLE 4C

BCM Results for All Intra HE Super-high-tier Lossy Coding
anchor as JCTVC-M0330 (RCE3.2)

|  | Y | U | V |
|---|---|---|---|
| Class F | −0.3% | −0.2% | −0.3% |
| Class B | 0.0% | 0.0% | 0.0% |
| SC RGB 444 | −1.8% | −1.7% | −1.7% |
| SC YUV 444 | −0.9% | −0.9% | −0.9% |
| RangeExt | 0.0% | 0.0% | 0.0% |

TABLE 4D

BCM Results for Random Access HE Main-tier Lossy Coding
anchor as JCTVC-M0330 (RCE3.2)

|  | Y | U | V |
|---|---|---|---|
| Class F | −0.3% | −0.4% | −0.3% |
| Class B | 0.0% | 0.0% | 0.0% |
| SC RGB 444 | −1.7% | −1.7% | −1.6% |
| SC YUV 444 | −0.6% | −0.6% | −0.7% |
| RangeExt | 0.0% | 0.0% | 0.0% |

TABLE 4E

BCM Results for Random Access HE High-tier Lossy Coding
anchor as JCTVC-M0330 (RCE3.2)

|  | Y | U | V |
|---|---|---|---|
| Class F | −0.3% | −0.3% | −0.2% |
| Class B | 0.0% | 0.0% | 0.0% |
| SC RGB 444 | −1.8% | −1.7% | −1.7% |
| SC YUV 444 | −0.7% | −0.6% | −0.6% |
| RangeExt | 0.0% | 0.0% | 0.0% |

TABLE 4F

BCM Results for Low Delay B HE Main-tier Lossy Coding
anchor as JCTVC-M0330 (RCE3.2)

|  | Y | U | V |
|---|---|---|---|
| Class F | −0.4% | −0.2% | 0.0% |
| Class B | 0.0% | 0.0% | 0.0% |
| SC RGB 444 | −1.3% | −1.3% | −1.3% |
| SC YUV 444 | −0.9% | −0.9% | −0.9% |
| RangeExt | 0.0% | 0.0% | 0.0% |

TABLE 4G

BCM Results for Low Delay B HE High-tier Lossy Coding
anchor as JCTVC-M0330 (RCE3.2)

|  | Y | U | V |
|---|---|---|---|
| Class F | −0.3% | −0.2% | −0.1% |
| Class B | 0.0% | 0.0% | 0.0% |
| SC RGB 444 | −1.6% | −1.5% | −1.5% |
| SC YUV 444 | −1.0% | −1.0% | −1.0% |
| RangeExt | 0.0% | 0.0% | 0.0% |

What is claimed is:

1. An apparatus for base color merging for multi-stage base color and index map (MBCIM) video coding of screen content, comprising:
    (a) a computer processor configured for video and image processing; and
    (b) programming in a non-transitory computer readable medium and executable on the computer processor with steps including:
        (i) performing multi-stage base color and index map (MBCIM) coding of screen content based on an intra coding framework;
        (ii) setting a first direction merge flag when a first neighbor of the current coding unit (CU) is determined to be available and coded with colors equal to the current coding unit (CU);
        (iii) setting a second direction merge flag when a second neighbor of the current coding unit (CU) is determined to be available and coded with colors equal to the current coding unit (CU);
        (iv) establishing a color for the current CU, by copying base color from the first neighbor to the current CU in response to detecting a first state of said first direction merge flag, or copying base color from the second neighbor to the current CU in response to detecting a first state of said second direction merge flag; and
        (v) coding the base color of the current CU when neither said first direction merge flag, or said second direction merge flag, is set.

2. The apparatus recited in claim 1, wherein said first neighbor is found in a horizontal direction from the current CU, into previously coded neighbors.

3. The apparatus recited in claim 2, wherein said first neighbor is a left neighbor, when coding is performed in a top down left to right manner.

4. The apparatus recited in claim 1, wherein said second neighbor is found in a vertical direction from the current CU, into previously coded neighbors.

5. The apparatus recited in claim 4, wherein said second neighbor is a top neighbor, when coding is performed in a top down left to right manner.

6. The apparatus recited in claim 1, wherein said apparatus is configured for execution within high efficiency video coding (HEVC) systems.

7. The apparatus recited in claim 6, wherein said apparatus is configured for range extension (RExt) in HEVC.

8. The apparatus recited in claim 1, wherein said screen content refers to computer generated images or videos.

9. The apparatus recited in claim 1, wherein said screen content differs from photographic images as CU blocks are dominated by a limited number of major colors.

10. The apparatus recited in claim 1, wherein said screen content differs from photographic images as the structure of CU blocks has additional complexity.

11. The apparatus recited in claim 1, wherein said programming executable on the computer processor is configured for coding the base color of the current CU by performing steps including: (a) decomposition of each intra predict unit (PU) into color components and structure components; and (b) performing a two-stage prediction scheme employed to generate two prediction indexes for each pixel to code those structure components.

12. An apparatus for base color merging for multi-stage base color and index map (MBCIM) video coding of screen content in response to high efficiency video coding (HEVC), comprising:
  (a) a computer processor configured for video and image processing; and
  (b) programming in a non-transitory computer readable medium and executable on the computer processor with steps including:
   (i) performing multi-stage base color and index map (MBCIM) coding of screen content based on an intra coding framework;
   (ii) setting a first direction merge flag when a first neighbor of the current coding unit (CU) is determined to be available and coded with colors equal to the current coding unit (CU);
   (iii) setting a second direction merge flag when a second neighbor of the current coding unit (CU) is determined to be available and coded with colors equal to the current coding unit (CU);
   (iv) wherein said first neighbor and said second neighbor are selected from previously coded horizontal and vertical neighbors;
   (v) establishing a color for the current CU, by copying base color from the first neighbor to the current CU in response to detecting a first state of said first direction merge flag, or copying base color from the second neighbor to the current CU in response to detecting a first state of said second direction merge flag; and
   (vi) coding the base color of the current CU when neither said first direction merge flag, or said second direction merge flag, is set.

13. The apparatus recited in claim 12, wherein said first neighbor is found in a horizontal direction from the current CU, into previously coded neighbors.

14. The apparatus recited in claim 13, wherein said first neighbor is a left neighbor, when coding is performed in a top down left to right manner.

15. The apparatus recited in claim 12, wherein said second neighbor is found in a vertical direction from the current CU, into previously coded neighbors.

16. The apparatus recited in claim 15, wherein said second neighbor is a top neighbor, when coding is performed in a top down left to right manner.

17. The apparatus recited in claim 12, wherein said apparatus is configured for range extension (RExt) in HEVC.

18. The apparatus recited in claim 12, wherein said screen content is computer generated, and differs from photographic images as coding unit (CU) blocks are dominated by a limited number of major colors.

19. The apparatus recited in claim 12, wherein said programming executable on the computer processor is configured for coding the base color of the current CU by performing steps including: (a) decomposition of each intra predict unit (PU) into color components and structure components; and (b) performing a two-stage prediction scheme employed to generate two prediction indexes for each pixel to code those structure components.

20. A method of performing base color merging for multi-stage base color and index map (MBCIM) video coding of screen content, comprising:
  (a) performing multi-stage base color and index map (MBCIM) coding of screen content based on an intra coding framework by a computer processor configured for video and image processing in response to programming executable by said computer processor from a non-transitory computer readable memory or medium;
  (b) setting a first direction merge flag when a first neighbor of the current coding unit (CU) is determined to be available and coded with colors equal to the current coding unit (CU);
  (c) setting a second direction merge flag when a second neighbor of the current coding unit (CU) is determined to be available and coded with colors equal to the current coding unit (CU); and
  (d) establishing a color for the current CU, by copying base color from the first neighbor to the current CU in response to detecting a first state of said first direction merge flag, or copying base color from the second neighbor to the current CU in response to detecting a first state of said second direction merge flag; and
  (e) coding the base color of the current CU when neither said first direction merge flag, or said second direction merge flag, is set.

* * * * *